(12) United States Patent
Pandian et al.

(10) Patent No.: US 12,053,940 B2
(45) Date of Patent: Aug. 6, 2024

(54) ACTUATOR FOR AIRCRAFT

(71) Applicant: Crompton Technology Group Limited, Banbury (GB)

(72) Inventors: Navaneethakrishnan Pandian, Karnataka (IN); James William Bernard, Brackley (GB); Jon Pethick, Leicestershire (GB); Michael Somerfield, Stoke-on-Trent (GB); Lee Slater, Dudley (GB)

(73) Assignee: CROMPTON TECHNOLOGY GROUP LIMITED, Banbury (GB)

( * ) Notice: Subject to any disclaimer, the term of this patent is extended or adjusted under 35 U.S.C. 154(b) by 264 days.

(21) Appl. No.: 17/004,699

(22) Filed: Aug. 27, 2020

(65) Prior Publication Data

US 2021/0237856 A1 Aug. 5, 2021

(30) Foreign Application Priority Data

Jan. 30, 2020 (IN) .............................. 202011004199

(51) Int. Cl.
  *F16H 25/24* (2006.01)
  *B29C 70/34* (2006.01)
  (Continued)

(52) U.S. Cl.
  CPC ............ *B29C 70/48* (2013.01); *B29C 70/347* (2013.01); *F16H 25/24* (2013.01);
  (Continued)

(58) Field of Classification Search
  CPC ............... F16H 25/24; F16H 2025/249; F16H 2057/02091; F16H 57/032;
  (Continued)

(56) References Cited

U.S. PATENT DOCUMENTS 2,283,839 A * 5/1942 Wright ................. H02K 5/1732
  384/536
2,701,478 A 2/1955 Riess
  (Continued)

FOREIGN PATENT DOCUMENTS

DE 10325522 A1 * 12/2004 ............ F16C 25/083
EP 1865225 A1 12/2007
  (Continued)

OTHER PUBLICATIONS

European Search Report Issued in European Application No. 21154560.3-1010 dated Jun. 18, 2021; 7 Pages.

*Primary Examiner* — Bobby Rushing, Jr.
(74) *Attorney, Agent, or Firm* — CANTOR COLBURN LLP

(57) ABSTRACT

An actuator includes: a cylinder, formed of carbon fiber reinforced polymer (CFRP), that extends along an actuator axis between a cylinder first end and a cylinder second end, and defines a cylinder inner diameter surface; a screw shaft that extends along the actuator axis between a screw shaft first end and a screw shaft second end, that is at least partially within the cylinder, and that is operationally connected, intermediate of the screw shaft first and second ends, to the cylinder second end; a screw shaft head affixed to the screw shaft first end, that in operation rotates relative to the cylinder, and that defines a screw shaft head outer diameter surface that faces the cylinder inner diameter surface with a slip fit therebetween; and a bearing ring affixed to the screw shaft head outer diameter surface, that is formed of polyether ether ketone (PEEK).

15 Claims, 3 Drawing Sheets

(51) Int. Cl.
*B29C 70/48* (2006.01)
*B29K 63/00* (2006.01)
*B29K 271/00* (2006.01)
*B29K 307/04* (2006.01)
*B29L 31/00* (2006.01)

(52) U.S. Cl.
CPC ...... *B29K 2063/00* (2013.01); *B29K 2271/00* (2013.01); *B29K 2307/04* (2013.01); *B29L 2031/748* (2013.01); *F16H 2025/249* (2013.01)

(58) Field of Classification Search
CPC .............. F16H 2025/2481; F16C 33/12; F16C 33/121; F16C 2202/50
See application file for complete search history.

(56) References Cited

U.S. PATENT DOCUMENTS

| | | | | |
|---|---|---|---|---|
| 4,614,128 A | * | 9/1986 | Fickler | F16H 25/2018 74/89.31 |
| 5,131,818 A | | 7/1992 | Wittkop et al. | |
| 5,174,167 A | * | 12/1992 | Hill | F16H 25/2015 74/89.37 |
| 6,536,953 B1 | * | 3/2003 | Cope | B65H 54/70 384/536 |
| 8,505,399 B2 | * | 8/2013 | Hirai | F16H 25/2015 33/37 |
| 8,998,495 B2 | | 4/2015 | Hirose et al. | |
| 9,261,083 B2 | * | 2/2016 | Sechler | F04B 53/20 |
| 9,458,885 B2 | | 10/2016 | Ishii et al. | |
| 10,077,807 B2 | * | 9/2018 | Ishii | F16C 33/208 |
| 2006/0142656 A1 | * | 6/2006 | Malackowski | A61B 90/39 600/424 |
| 2010/0158424 A1 | * | 6/2010 | Muramatsu | F16C 35/067 384/548 |
| 2013/0248280 A1 | * | 9/2013 | Stamm | B62D 5/0451 180/444 |
| 2018/0283424 A1 | * | 10/2018 | Beale | E04C 3/28 |
| 2019/0257363 A1 | | 8/2019 | Dietrich et al. | |

FOREIGN PATENT DOCUMENTS

| | | | | |
|---|---|---|---|---|
| EP | 2198175 B1 | * | 8/2016 | ............ F16C 27/066 |
| EP | 3530984 A1 | | 8/2019 | |
| FR | 3034148 A3 | | 9/2016 | |
| GB | 2304832 A | | 3/1997 | |
| JP | 201462585 A | | 4/2014 | |
| JP | 5623852 B2 | | 11/2014 | |
| WO | 2019181365 A1 | | 9/2019 | |

* cited by examiner

ACTUATOR FOR AIRCRAFT

CROSS-REFERENCE TO RELATED APPLICATIONS

This application claims the benefit of IN Patent Application No. 202011004199, filed Jan. 30, 2020, the disclosure of which is incorporated herein by reference in its entirety.

BACKGROUND

The embodiments herein relate to an actuator for an aircraft and more specifically to an actuator that includes a cylinder formed of carbon fiber reinforced polymer (CFRP) and a screw shaft head having a bearing ring formed of polyether ether ketone (PEEK).

Control surfaces for aircraft may be actuated, e.g., advanced and retracted, by actuators that utilize cylinders controlled by screw shafts. Weight of, and friction between, moving components of the actuators may become a concern during a useful life of the actuators.

BRIEF SUMMARY

Disclosed is an actuator that includes: a cylinder, formed of carbon fiber reinforced polymer (CFRP), the cylinder extending along an actuator axis between a cylinder first end and a cylinder second end, and the cylinder defining a cylinder inner diameter surface; a screw shaft that extends along the actuator axis between a screw shaft first end and a screw shaft second end, wherein the screw shaft is at least partially within the cylinder, and wherein the screw shaft is operationally connected, intermediate of the screw shaft first and second ends, to the cylinder second end; a screw shaft head affixed to the screw shaft first end, so that in operation the screw shaft head rotates relative to the cylinder, wherein the screw shaft head defines a screw shaft head outer diameter surface that faces the cylinder inner diameter surface with a slip fit therebetween; and a bearing ring affixed to the screw shaft head outer diameter surface, wherein the bearing ring is formed of polyether ether ketone (PEEK).

In addition to one or more of the above disclosed aspects, or as an alternate, the cylinder inner diameter surface and the bearing ring are lubricant free.

In addition to one or more of the above disclosed aspects, or as an alternate, the bearing ring is bronze that is filled with the PEEK.

In addition to one or more of the above disclosed aspects, or as an alternate, the cylinder is formed of CFRP fibers that are oriented at an acute angle relative to the actuator axis.

In addition to one or more of the above disclosed aspects, or as an alternate, the CFRP fibers are oriented at eight degrees or less relative to the actuator axis.

In addition to one or more of the above disclosed aspects, or as an alternate, the cylinder is formed of the CFRP fibers in a binding resin.

In addition to one or more of the above disclosed aspects, or as an alternate, the binding resin is a thermoset epoxy.

In addition to one or more of the above disclosed aspects, or as an alternate, the actuator is an electromechanical actuator.

In addition to one or more of the above disclosed aspects, or as an alternate the actuator further includes a motor operationally connected to the screw shaft and configured to rotationally drive the screw shaft, thereby linearly driving the cylinder.

In addition to one or more of the above disclosed aspects, or as an alternate, the motor is operationally connected to the screw shaft second end.

Further disclosed is a method assembling an actuator, including: operationally connecting a cylinder to a screw shaft, wherein the cylinder extends along an actuator axis between a cylinder first end and a cylinder second end, the screw shaft extends along the actuator axis between a screw shaft first end and a screw shaft second end, and the cylinder second end is operationally connected to the screw shaft intermediate of the screw shaft first end and the screw shaft second end, and wherein the cylinder is formed of carbon fiber reinforced polymer (CFRP), positioning a bearing ring, formed of polyether ether ketone (PEEK), about a screw shaft outer diameter surface of a screw shaft head connected to the screw shaft first end, wherein a cylinder inner diameter surface of the cylinder and the bearing ring are configured for a slip fit therebetween.

In addition to one or more of the above disclosed aspects, or as an alternate, the method further includes configuring the actuator so that the cylinder inner diameter surface and the bearing ring are lubricant free.

In addition to one or more of the above disclosed aspects, or as an alternate, the method further includes operationally connecting the screw shaft to a motor.

In addition to one or more of the above disclosed aspects, or as an alternate, the method further includes connecting the motor to the screw shaft second end.

In addition to one or more of the above disclosed aspects, or as an alternate, the method further includes forming the bearing ring by filling a bronze bearing ring with the PEEK.

In addition to one or more of the above disclosed aspects, or as an alternate, the method further includes forming the cylinder from CFRP fibers such that the CFRP fibers are oriented at an acute angle relative to an actuator center axis.

In addition to one or more of the above disclosed aspects, or as an alternate, the method further includes forming the cylinder from CFRP fibers such that the CFRP fibers are oriented eight degrees relative to an actuator center axis.

In addition to one or more of the above disclosed aspects, or as an alternate, forming the cylinder from the CFRP fibers further includes forming the CFRP fibers in a binding resin.

In addition to one or more of the above disclosed aspects, or as an alternate, forming the cylinder from the CFRP fibers further includes: forming the binding resin from a thermoset epoxy.

In addition to one or more of the above disclosed aspects, or as an alternate, forming the cylinder from the CFRP fibers further includes: filament winding the binding resin with the CFRP fibers; braiding the binding resin with the CFRP fibers; or resin transfer molding the binding resin with the CFRP fibers.

BRIEF DESCRIPTION OF THE DRAWINGS

The present disclosure is illustrated by way of example and not limited in the accompanying figures in which like reference numerals indicate similar elements.

DETAILED DESCRIPTION

A detailed description of one or more embodiments of the disclosed apparatus and method are presented herein by way of exemplification and not limitation with reference to the Figures.

Figure 1:
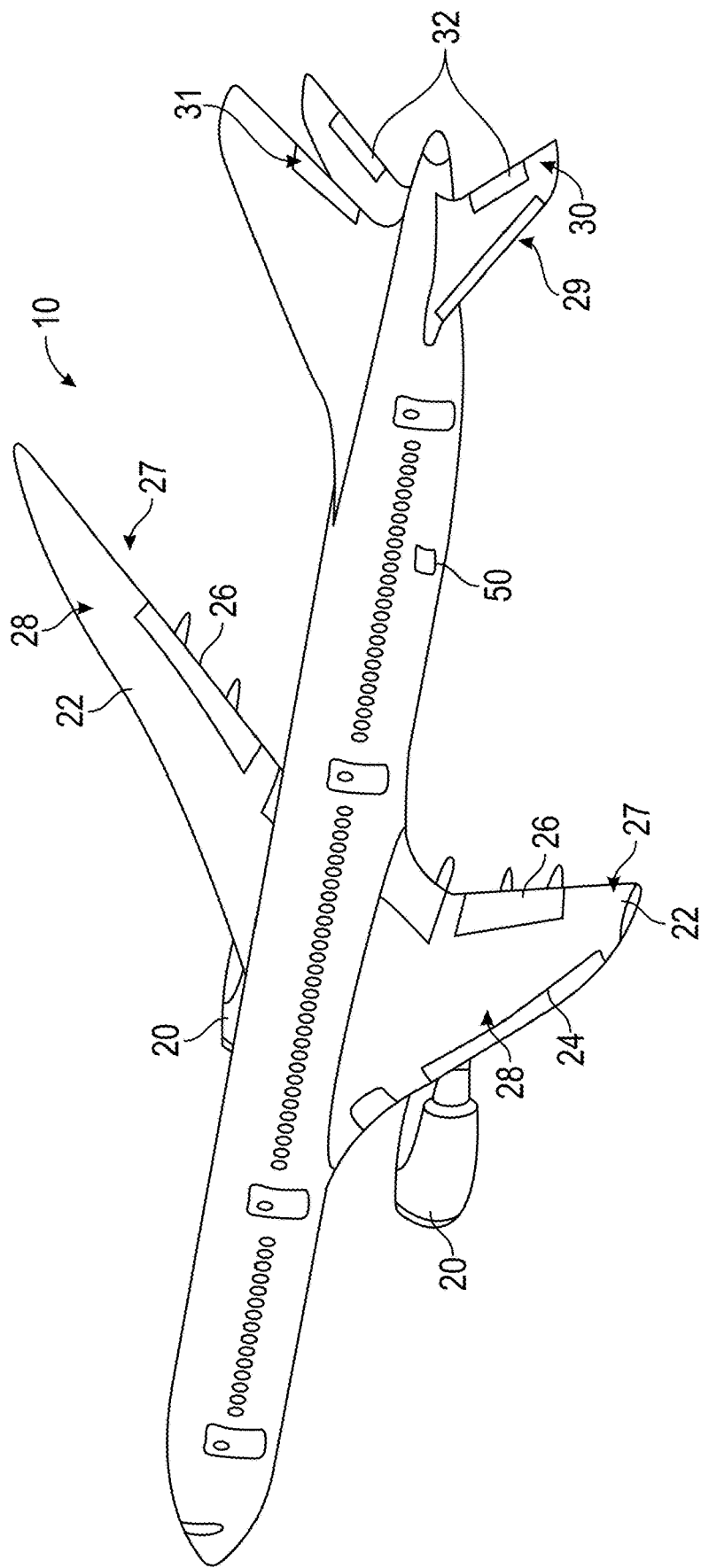
FIG. 1 is a perspective view of an aircraft where embodiments of the present invention can be implemented.

FIG. 1 illustrates an example of a commercial aircraft (aircraft) 10 having aircraft engines surrounded by (or otherwise carried in) a nacelle 20. The aircraft 10 includes two wings 22 that can each include one or more slats 24 and one or more flaps 26. The aircraft may further include ailerons 27, spoilers 28, horizontal stabilizer trim tabs 29, horizontal stabilizer 30 and rudder 31, and vertical stabilizer 32 (the tail structure being collectively referred to as an and empennage) each of which may be typically referred to as "control surfaces" as they are movable under aircraft power systems. In addition, the control surfaces of the aircraft 10 may include an access door 50 for accessing one or more internal systems. Control surfaces of the aircraft 10 may be advanced (e.g., deployed) and retracted by use of actuators that utilize cylinders operated by screw shafts. As indicated, weight of, and friction between, moving parts of the actuators may become an issue during the useful life of the actuators, which may be made of, e.g., steel.

Figure 2:
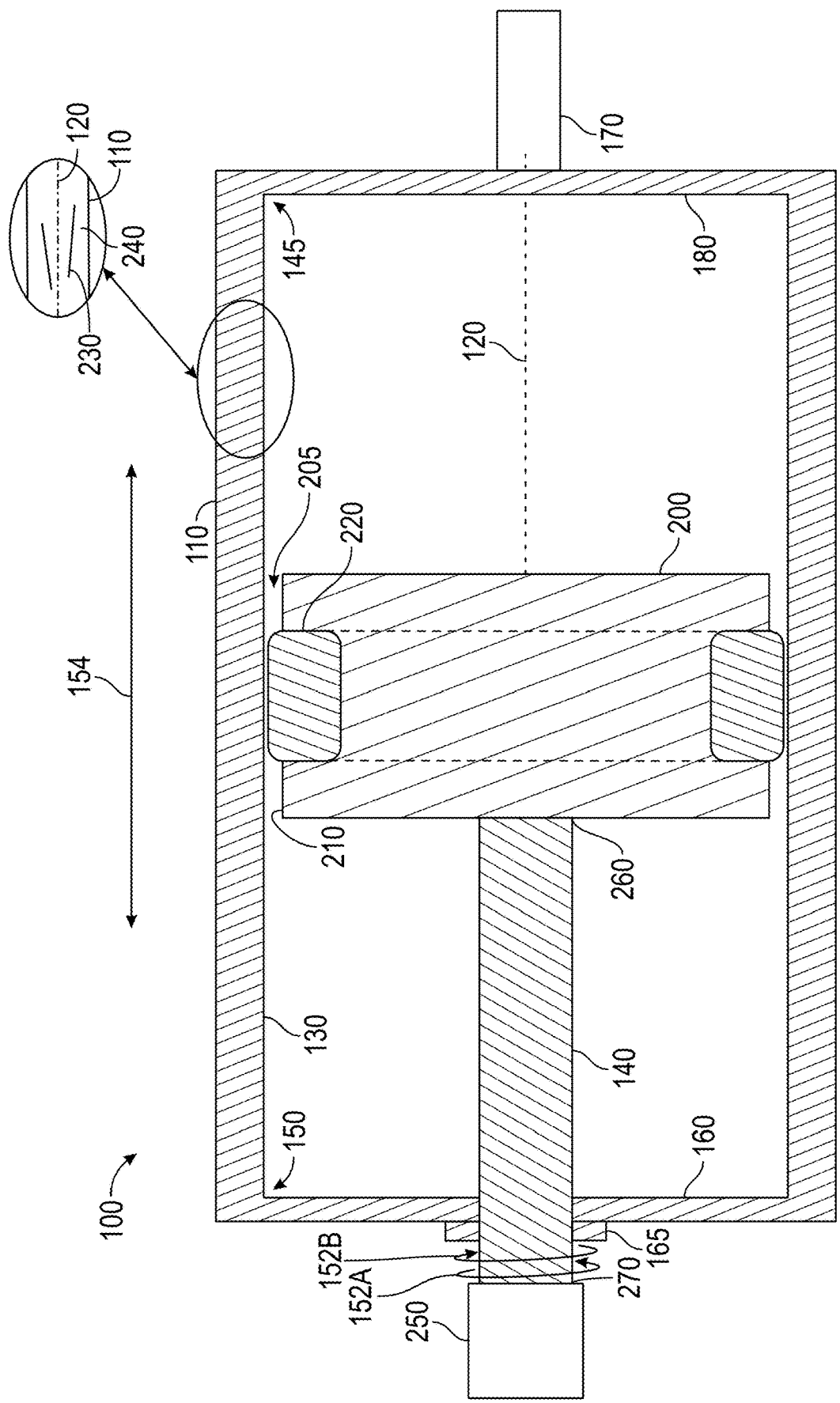
FIG. 2 shows a cross section of an actuator utilized for moving control surfaces of the aircraft, according to an embodiment.

In view of the above stated concerns with aircraft actuators, FIG. 2 discloses an actuator 100 having a cylinder 110 formed of a carbon fiber reinforced polymer (CFRP). The cylinder 110 extends along an actuator axis 120. The cylinder 110 defines a cylinder inner diameter surface 130. The cylinder 110 extends along the axis 120 between a cylinder forward end 145 (a cylinder first end) and a cylinder aft end 150 (a cylinder second end). A screw shaft 140 extends along the actuator axis 120, at least partially within the cylinder 110, between a screw shaft forward end 260 (a screw shaft first end) and a screw shaft aft end 270 (a screw shaft second end). The screw shaft 140 is operationally connected, intermediate the screw shaft forward and aft ends 260, 270, to the cylinder 110 aft end 150. Rotation of the screw shaft 140 in either rotational direction 152A, 152B translates the cylinder 110 in a linear direction 154 to either advance or retract the cylinder 110. An aft end plate 160 is affixed to the aft end of the cylinder 110. Connected to the aft plate 160 is a plate connector 165, such as a nut with a screw thread, that mates with a screw thread of the screw shaft 140. A mechanical connector 170 (illustrated schematically) may be connected to a forward end plate 180 that is affixed to the forward end 145 of the cylinder 110. Movement of cylinder 110 will result in advancing or retracing an aircraft control surface (FIG. 1) connected to the mechanical connector 170.

A screw shaft head 200 is affixed to a screw shaft forward end 260 of the screw shaft 140. In operation, the screw shaft head 200 rotates with the screw shaft 140, relative to the cylinder 110. The screw shaft head 200 defines a screw shaft head outer diameter surface 210 that faces the cylinder inner diameter surface 130 with a slip fit 205 therebetween. Utilizing the screw shaft head 200 ensures that translational motion of the cylinder 110 remains along the linear direction 154 relative to the actuator axis 120, e.g., under loading conditions. In addition, at least a small gap exists between the screw shaft head 200 and the cylinder 110 to minimize friction therebetween during normal operation. A bearing ring 220 is affixed to the screw shaft head outer diameter surface 210. According to an embodiment the bearing ring 220 is formed of polyether ether ketone (PEEK), which is loaded with Polytetrafluoroethylene (PTFE), graphite, carbon fiber. In one embodiment, the bearing ring 220 is formed of bronze that is filled with the PEEK.

According to an embodiment the cylinder 110 is formed of CFRP fibers 230 that are oriented at an acute angle relative to the actuator axis 120. For example the CFRP fibers 230 are oriented at eight degrees or less relative to the actuator axis 120. According to an embodiment the cylinder 110 is formed of the CFRP fibers 230 in a binding resin 240. For example, the binding resin 240 is a thermoset epoxy. According to an embodiment the cylinder inner diameter surface 130 and the bearing ring 220 are lubricant free. That is, in use, cylinder 110, having the CFRP fibers 230 at the acute angle to the actuator axis 120, will produce a relatively low amount of friction against the bearing ring 220. In addition, PEEK will, over time and utilization, form a low friction coating between the cylinder 110 and the bearing ring 220, further reducing frictional loading therebetween. The result of this configuration is an actuator 100 having less weight and friction than a comparable actuator made of steel.

In one embodiment the actuator 100 is an electromechanical actuator. For example, a motor 250 is operationally connected to the screw shaft 140 and configured to rotationally drive the screw shaft 140 to linearly drive the cylinder 110. The motor 250 is operationally connected to a screw shaft aft end 270, which is spaced apart from the screw shaft forward end 260 along the actuator axis 120.

Figure 3:
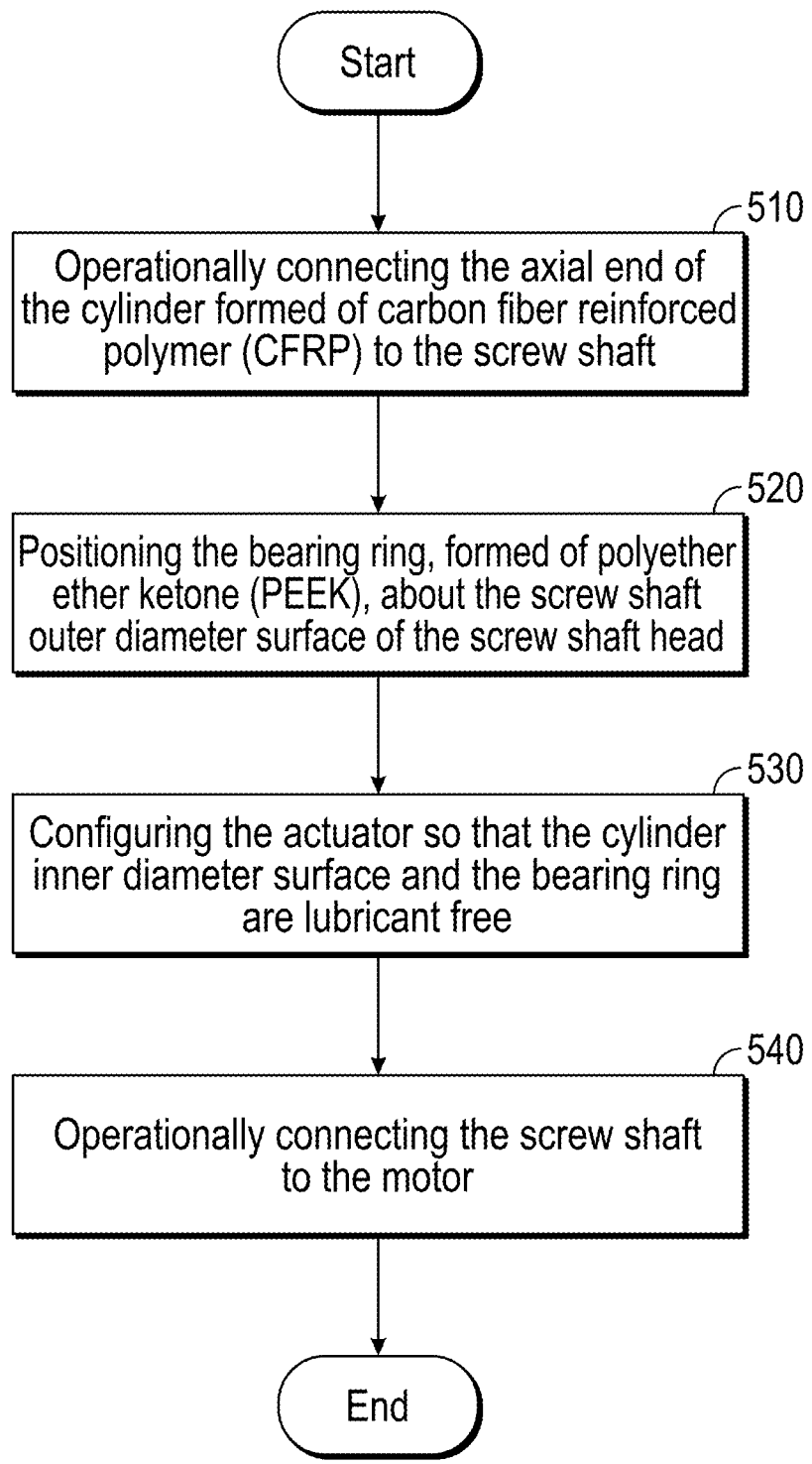
FIG. 3 is a flowchart showing a method of configuring an actuator for moving control surfaces of an aircraft, according to an embodiment.

Turning to FIG. 3, a flowchart shows a method assembling the actuator 100. As shown in block 510 the method includes operationally connecting the axial end of the cylinder to the screw shaft, wherein the cylinder 110 is formed of the carbon fiber reinforced polymer (CFRP). As shown in block 520, the method includes positioning the bearing ring 220, formed of polyether ether ketone (PEEK), about the screw shaft outer diameter surface 210 of the screw shaft head 200 connected to the screw shaft forward end 260 of the screw shaft 140. As indicated, the cylinder inner diameter surface 130 of the cylinder 110 and the bearing ring 220 are configured for the slip fit 205 therebetween. As shown in block 530, the method includes configuring the actuator 100 so that the cylinder inner diameter surface 130 and the bearing ring 220 are lubricant free. As shown in block 540, the method includes operationally connecting the screw shaft 140 to the motor 250. As indicated, this step may include connecting the motor 250 to a screw shaft aft end 270 of the screw shaft 140.

Further, as indicated, with the actuator 100 assembled according to the method shown with the flowchart of FIG. 3, the bearing ring 220 may be formed by filling a bronze bearing ring with the PEEK. Moreover, as indicated, the cylinder 110 may be formed from CFRP fibers such that the CFRP fibers are oriented at an acute angle relative to an actuator axis 120. For example, as indicated, the cylinder 110 may be formed from the CFRP fibers such that the CFRP fibers are oriented eight degrees relative to an actuator center axis. In addition, as indicated, forming the cylinder 110 from the CFRP fibers may include forming the CFRP fibers in a binding resin. For example, the binding resin may be a thermoset epoxy. Additionally, forming the cylinder 110 from the CFRP fibers may include filament winding the binding resin with the CFRP fibers, braiding the binding resin with the CFRP fibers or resin transfer molding the binding resin with the CFRP fibers.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An actuator comprising:
a cylinder, formed of carbon fiber reinforced polymer (CFRP) formed at an acute angle relative to an actuator axis, wherein the CFRP fibers are oriented at less than eight degrees relative to the actuator axis,
the cylinder extending along the actuator axis between a cylinder first end that is a cylinder forward end and a cylinder second end that is a cylinder aft end, and the cylinder defining a constant cylinder inner diameter surface between its forward and aft ends, a forward plate at the forward end of the cylinder and an aft plate located at the aft pend of the cylinder;
a screw shaft that extends along the actuator axis between a screw shaft first end and a screw shaft second end that is connected to a motor, wherein the screw shaft is at least partially within the cylinder through the cylinder aft end, and wherein the screw shaft is operationally connected, intermediate of the screw shaft first and second ends, to the cylinder second end;
a threaded nut affixed to the aft plate of the cylinder, wherein the screw shaft extends through the cylinder aft end via the threaded nut; and
a screw shaft head affixed to the screw shaft first end, so that in operation the screw shaft head rotates relative to the cylinder, wherein the screw shaft head defines a screw shaft head outer diameter surface that faces the cylinder inner diameter surface with a slip fit therebetween, wherein rotation of the screw shaft in either direction translates the cylinder to advance or retract the cylinder;
a mechanical connector affixed to the forward plate, extending axially outwardly from the cylinder, that connects to a movable component; and
a bearing ring seated within a groove defined in the screw shaft head outer diameter surface and thereby affixed to the screw shaft head outer diameter surface, wherein the bearing ring is formed of polyether ether ketone (PEEK), wherein the bearing ring has a larger diameter than an outer diameter of the screw shaft head, and wherein the cylinder inner diameter surface and the bearing ring are lubricant free.

2. The actuator of claim 1, wherein
the bearing ring is bronze that is filled with the PEEK.
3. The actuator of claim 1, wherein
the cylinder is formed of the CFRP fibers in a binding resin.
4. The actuator of claim 3, wherein
the binding resin is a thermoset epoxy.
5. The actuator of claim 1, wherein
the actuator is an electromechanical actuator.
6. A method of assembling the actuator of claim 1, comprising:
operationally connecting the cylinder to the screw shaft, wherein the cylinder extends along the actuator axis between a cylinder first end and the cylinder second end, the screw shaft extends along the actuator axis between the screw shaft first end and the screw shaft second end, and the cylinder second end is operationally connected to the screw shaft intermediate of the screw shaft first end and the screw shaft second end, and wherein the cylinder is formed of carbon fiber reinforced polymer (CFRP),
positioning the bearing ring, formed of polyether ether ketone (PEEK), about the screw shaft outer diameter surface of the screw shaft head connected to the screw shaft first end,
wherein the cylinder inner diameter surface of the cylinder and the bearing ring are configured for the slip fit therebetween.
7. The method of claim 6, further comprising
configuring the actuator so that the cylinder inner diameter surface and the bearing ring are lubricant free.
8. The method of claim 6, further comprising
operationally connecting the screw shaft to a motor.
9. The method of claim 8, further comprising
connecting the motor to the screw shaft second end.
10. The method of claim 6, further comprising
forming the bearing ring by filling a bronze bearing ring with the PEEK.
11. The method of claim 6, further comprising
forming the cylinder from CFRP fibers such that the CFRP fibers are oriented at an acute angle relative to an actuator center axis.
12. The method of claim 6, further comprising
forming the cylinder from CFRP fibers such that the CFRP fibers are oriented at less than eight degrees relative to an actuator center axis.
13. The method of claim 11, wherein
forming the cylinder from the CFRP fibers further comprises:
forming the CFRP fibers in a binding resin.
14. The method of claim 13, wherein
forming the cylinder from the CFRP fibers further comprises:
forming the binding resin from a thermoset epoxy.
15. The method of claim 13, wherein
forming the cylinder from the CFRP fibers further comprises:
filament winding the binding resin with the CFRP fibers;
braiding the binding resin with the CFRP fibers; or
resin transfer molding the binding resin with the CFRP fibers.

* * * * *